Patented Mar. 17, 1953

2,632,020

UNITED STATES PATENT OFFICE 2,632,020

DITHIOPHOSPHATE ESTERS

Erick I. Hoegberg, Stamford, Conn., assignor to American Cyanamid Company, New York, N. Y., a corporation of Maine No Drawing. Application July 7, 1951,
Serial No. 235,670

6 Claims. (Cl. 260—461)

The present invention relates to new and useful organic phosphate compounds.

These new compounds are phosphate esters which conform to the general formula.

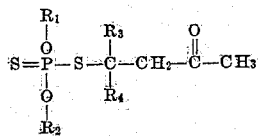

in which $R_1$ and $R_2$ are chosen from the group consisting of alkyl, aralkyl, aryl and alkaryl radicals, and $R_3$ and $R_4$ are members of the group consisting of hydrogen and the methyl radical.

In the new compounds, $R_1$ and $R_2$ may be the same or different radicals. Furthermore, it is to be understood that when $R_1$ and $R_2$ stand for alkyl radicals, they represent both the straight chain and branched chain, the saturated and unsaturated, and the cycloaliphatic hydrocarbon radicals. The $R_1$ and $R_2$ radicals may also carry halogen substituents, particularly chlorine and bromine. Typical examples of these radicals are methyl, ethyl, n-propyl, isopropyl, isobutyl, sec.-amyl, n-hexyl, 2-ethylhexyl, n-octyl, n-decyl, n-dodecyl, n-octadecyl, oleyl, cetyl, ceryl, allyl, bromomethyl, 2-chloroethyl, cyclohexyl, benzyl, phenyl, p-chlorophenyl, tolyl, xylyl, naphthyl, and naphthylmethyl.

These phosphate esters may be readily prepared by reacting an acid phosphate of the formula

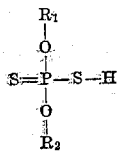

in which $R_1$ and $R_2$ have the meaning shown above, with an α,β-unsaturated ketone of the formula

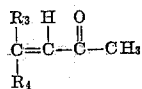

in which $R_3$ and $R_4$ have the meaning shown above.

A typical reaction in which O,O-dimethyl dithiophosphoric acid is reacted with methyl vinyl ketone to produce O,O-dimethyl S-(3-oxo-1-butyl) dithiophosphate may be illustrated as follows:

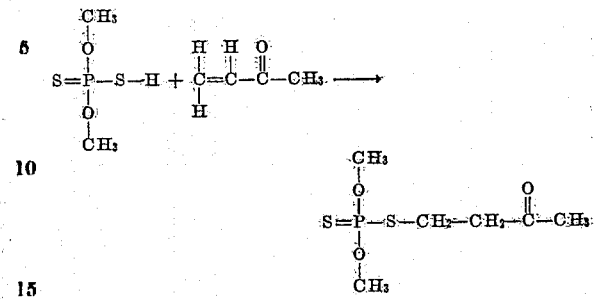

The reaction is exothermic and may be readily controlled by carrying it out in the presence of an inert solvent. Such solvents include saturated aliphatic esters such as ethyl acetate, amyl acetate, 2-ethylhexyl acetate, methyl propionate, methyl butyrate, ethyl butyrate, and isopropyl butyrate; saturated aliphatic nitriles such as acetonitrile and propionitrile; dioxane; benzene, nitrobenzene, chlorobenzene, toluene, xylene, chloroform, and carbon tetrachloride.

The reaction is preferably carried out at a temperature within the range of from about 20° to 150° C. However, temperatures outside of this range may be employed depending upon the type of reactants and solvents utilized.

The following examples will further illustrate the invention.

Example 1

A solution consisting of 38 g. of O,O-diethyl dithiophosphoric acid (98% purity) in 40 cc. of benzene was added gradually to 16.5 g. of methyl vinyl ketone (85% purity) in 30 cc. of benzene. The mixture was held at 20°–25° C. (ice-bath cooling) during the addition, followed by heating at 45° C. for a period of ½ hour. The reaction mixture was allowed to stand at room temperature for 12 hours, then washed with 10% sodium bicarbonate solution and with water. The benzene solution was stripped of solvent by distillation at reduced pressure (10–20 mm.). The residual product, O,O-diethyl, S-(3-oxo-1-butyl) dithiophosphate, weighing 42.5 g. (81.4% yield), was a clear, amber-colored liquid having a refractive index $n_D^{25}$ 1.5074.

Example 2

86 g. of methyl vinyl ketone (85.0% purity) were added slowly to 272 g. of O,O-di(2-chloroethyl) dithiophosphoric acid (92.5% purity) during a period of ½ hour, the temperature of the mixture remaining at about 40° C. during the addition. The reaction mixture was then stirred at room temperature for 2 hours. 200 cc. of benzene were added and the mixture was washed with 10% sodium bicarbonate solution, followed by washing with water. The benzene solution was stripped of solvent by distillation on a steam bath under reduced pressure. The residual product, O,O-di(2-chloroethyl) S-(3-oxo-1-butyl) dithiophosphate, weighing 276 g. (91.6% yield), was a dark brown liquid.

Example 3

The procedure of Example 2 was employed using 86 g. of methyl vinyl ketone (85.0% purity) and 242 g. of O,O-di-sec.-butyl dithiophosphoric acid. A 93% yield of O,O-di-sec.-butyl S-(3-oxo-1-butyl) dithiophosphate was obtained. The product was a clear, amber-colored liquid.

Example 4

The procedure of Example 2 was employed using 83 g. of methyl vinyl ketone (85.0% purity) and 321 g. of O,O-di(4-methyl-2-pentyl) dithiophosphoric acid (93% purity). The residual product, O,O-di-(4-methyl-2-pentyl) S-(3-oxo-1-butyl) dithiophosphate, weighing 347 g., was a clear light brown liquid.

Example 5

The procedure of Example 2 was employed using 43 g. of methyl vinyl ketone (85% purity) and 203 g. of O,O-di(2-octyl) dithiophosphoric acid (87.0% purity). A 93.4% yield of O,O-di(2-octyl) S-(3-oxo-1-butyl) dithiophosphate was obtained. The product was a clear, dark red liquid.

Example 6

19.6 g. of mesityl oxide were added gradually to 38 g. of O,O-diethyl dithiophosphoric acid (98% purity). Heat was evolved and the temperature of the mixture rose to about 70° C. during the addition. After the reaction had subsided, the mixture was warmed on a steam bath for about ½ hour, then allowed to stand at room temperature for several hours. The reaction mixture was dissolved in 50 cc. of benzene, washed with 10% sodium bicarbonate solution and with water. The benzene solution was stripped of solvent by distillation on a steam bath under reduced pressure (10–20 mm.). The residual product, O,O-diethyl S-(2-methyl-4-oxo-2-pentyl) dithiophosphate, weighing 49.7 g. (88% yield), was a clear, amber-colored liquid having a refractive index $n_D^{25}$ 1.5087.

Example 7

The procedure of Example 6 was employed using 108 g. of mesityl oxide, 272 g. of O,O-di(2-chloroethyl) dithiophosphoric acid (92.5% purity), and 200 cc. of benzene. The temperature of the mixture was held at about 40° C. during the addition of the mesityl oxide. The residual product, O,O-di(2-chloroethyl) S-(2-methyl-4-oxo-2-pentyl) dithiophosphate, weighing 304 g. (86.4% yield) was a dark brown liquid.

Example 8

The procedure of Example 6 was employed using 29.4 g. of mesityl oxide, 70.2% g. of O,O-diisopropyl dithiophosphoric acid (92% purity), and 100 cc. of benzene. The temperature of the mixture was held at about 65° C. during the addition of the mesityl oxide. The residual product, O,O-diisopropyl S-(2-methyl-4-oxo-2-pentyl) dithiophosphate, weighing 70.8 g. (76% yield), was a clear, light-brown liquid having a refractive index $n_D^{25}$ 1.4998.

Example 9

The procedure of Example 6 was employed using 108 g. of mesityl oxide, 271 g. of O,O-di-sec.-butyl dithiophosphoric acid (89% purity), and 200 cc. of benzene. The temperature of the mixture was held at about 50° C. during the addition of the mesityl oxide. The residual product, O,O-di-sec.-butyl S-(2-methyl-4-oxo-2-pentyl) dithiophosphate, weighing 336 g. (99% yield), was a clear, amber-colored liquid.

Example 10

The procedure of Example 6 was employed using 108 g. of mesityl oxide, 321 g. of O,O-di(4-methyl-2-pentyl) dithiophosphoric acid (93% purity), and 200 cc. of benzene. The temperature of the mixture was held at about 40° C. during the addition of the mesityl oxide. The residual product, O,O-di(4-methyl-2-pentyl) S-(2-methyl-4-oxo-2-pentyl) dithiophosphate, weighing 335 g. (85% yield), was a clear, yellow liquid.

Example 11

The procedure of Example 6 was employed using 6.9 g. of mesityl oxide, 42 g. of O,O-di-n-tetradecyl dithiophosphoric acid (87% purity), and 75 cc. of benzene. The temperature of the mixture was held at about 40° C. during the addition of the mesityl oxide. The residual product, O,O-di-n-tetradecyl S-(2-methyl-4-oxo-2-pentyl) dithiophosphate, weighing 35.3 g. (81% yield), was a clear, amber-colored liquid having a refractive index $n_D^{25}$ 1.4805.

Example 12

The procedure of Example 6 was employed using 19.6 g. of mesityl oxide, 57.1 g. of O,O-diphenyl dithiophosphoric acid (99% purity), and 100 cc. of benzene. The temperature of the mixture was held at about 60° C. during the addition of the mesityl oxide. The residual product, O,O-diphenyl S-(2-methyl-4-oxo-2-pentyl) dithiophosphate, weighing 56.5 g. (74% yield), was a brown, viscous liquid having a refractive index $n_D^{25}$ 1.5878.

The phosphate esters of the present invention are adapted for various uses, more particularly as insecticides, fungicides, plasticizers, corrosion inhibitors, flotation agents, and petroleum additives.

While the invention has been described with particular reference to specific embodiments, it is to be understood that it is not to be limited thereto, but is to be construed broadly and restricted solely by the scope of the appended claims.

I claim:

1. Phosphate esters of the general formula

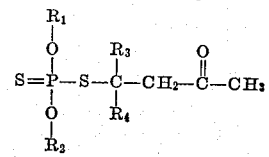

in which $R_1$ and $R_2$ are chosen from the group consisting of alkyl, aralkyl, aryl and alkaryl radicals, and $R_3$ and $R_4$ are members of the group consisting of hydrogen and the methyl radical.

2. O,O-diethyl S-(3-oxo-1-butyl) dithiophosphate.

3. O,O-di-sec.-butyl S-(3-oxo-1-butyl) dithiophosphate.

4. O,O-di(4-methyl-2-pentyl) S-(2-methyl-4-oxo-2-pentyl) dithiophosphate of the formula

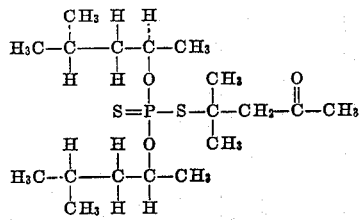

5. O,O-di-n-tetradecyl S-(2-methyl-4-oxo-2-pentyl) dithiophosphate of the formula

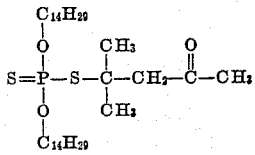

6. O,O-diphenyl S-(2-methyl-4-oxo-2-pentyl) dithiophosphate of the formula

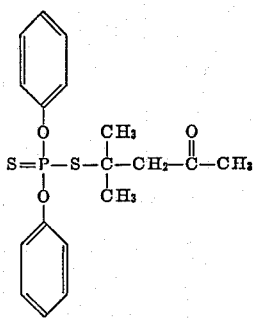

ERICK I. HOEGBERG.

REFERENCES CITED

The following references are of record in the file of this patent:

UNITED STATES PATENTS

| Number | Name | Date |
| --- | --- | --- |
| 2,494,283 | Cassady | Jan. 10, 1950 |
| 2,494,284 | Cassady | Jan. 10, 1950 |
| 2,578,652 | Cassaday | Dec. 18, 1951 |